United States Patent
Wayama et al.

(10) Patent No.: US 6,382,180 B2
(45) Date of Patent: May 7, 2002

(54) THROTTLE APPARATUS FOR AN INTERNAL COMBUSTION ENGINE

(75) Inventors: Eisuke Wayama; Toshifumi Usui; Shigeru Tokumoto; Yasuo Saito, all of Hitachinaka (JP)

(73) Assignees: Hitachi, Ltd., Tokyo; Hitachi Car Engineering Co., Ltd., Hitachinaka, both of (JP)

( * ) Notice: Subject to any disclaimer, the term of this patent is extended or adjusted under 35 U.S.C. 154(b) by 0 days.

(21) Appl. No.: 09/752,565

(22) Filed: Jan. 3, 2001

Related U.S. Application Data

(62) Division of application No. 09/413,546, filed on Oct. 6, 1999, now abandoned.

(30) Foreign Application Priority Data

Oct. 6, 1998 (JP) .......................................... 10-284591

(51) Int. Cl.$^7$ .............................. F02D 11/10; F02D 9/08
(52) U.S. Cl. ...................................... 123/399; 251/214
(58) Field of Search ............................... 123/337, 361, 123/399; 251/214, 305

(56) References Cited

U.S. PATENT DOCUMENTS

| | | | |
|---|---|---|---|
| 4,735,179 A | 4/1988 | Ejiri et al. ................... | 123/332 |
| 4,911,125 A | * 3/1990 | Sugawara et al. .......... | 123/399 |
| 4,947,815 A | 8/1990 | Peter ........................... | 123/399 |
| 4,982,710 A | * 1/1991 | Ohta et al. ................... | 123/399 |
| 5,146,886 A | * 9/1992 | Mannle et al. .......... | 123/399 X |
| 5,522,361 A | * 6/1996 | Pickman et al. ......... | 123/337 X |
| 5,640,942 A | * 6/1997 | Hollister ..................... | 123/337 |
| 6,067,958 A | * 5/2000 | Kamimura et al. ......... | 123/337 |

FOREIGN PATENT DOCUMENTS

| | | |
|---|---|---|
| JP | 63-150449 | 5/1988 |
| JP | 10-89096 | 4/1998 |
| JP | 10-131771 | 5/1998 |

* cited by examiner

*Primary Examiner*—Tony M. Argenbright
(74) *Attorney, Agent, or Firm*—Crowell & Moring LLP

(57) ABSTRACT

A returning spring 7 of the electronic control throttle and a default spring 8 for securing an initial opening degree (default opening degree) of the throttle valve 3 have diameters different from each other, and both of the springs 7, 8 are held around a shaft of the throttle valve shaft 3 and arranged between a gear 43 attached to the throttle valve shaft 3 and a wall portion of the throttle body 100. A shaft supporting gap of the throttle valve shaft 3 is filled with an air leak preventing material, and a minimum opening degree of the throttle valve is set to a value larger than an amount of overshoot of the throttle valve occurring when opening degree of the throttle valve is changed from a maximum opening degree of the throttle valve to the minimum opening degree.

5 Claims, 15 Drawing Sheets

THROTTLE APPARATUS FOR AN INTERNAL COMBUSTION ENGINE

This application is a division of Ser. No. 09/413,546, filed Oct. 6, 1999, now abandoned.

BACKGROUND OF THE INVENTION

The present invention relates to a throttle apparatus for an internal combustion engine and, more particularly, to an electronic control throttle device which controls opening and closing a throttle valve by driving an electric driven actuator based on a control signal.

In the electronic control throttle apparatus for controlling a throttle valve of an engine by driving an electric driven actuator (for example, a direct current motor, a stepping motor), a technology known is that an initial opening degree (default opening degree) of the throttle valve in an off state of engine key (in other words, at not energized state of the electric driven actuator) is set to a position larger than its full close position.

Here, the full close position does not mean a position for completely choking the intake air passage. Particularly, in a throttle device performing idling rotating speed control using only a throttle valve without any bypass passage for bypassing the throttle valve, the full close position is defined by classifying into a mechanical full close position and an electrical full close position to be described below.

The mechanical full close position means a minimum opening degree position of a throttle valve determined by a stopper, and the minimum opening degree is set at a position to slightly open the throttle valve from a position to completely choking the intake air passage in order to prevent the throttle valve from sticking. The electrical full close position means a minimum opening degree within a range of opening degrees used for control, and the minimum opening degree is set at an opening position slightly larger than the mechanical full close position in taking the mechanical full close position as the reference by controlling of driving the electric driven actuator (for instance, a position larger than the mechanical full close position by approximately 1°). In the electronic control throttle device, the electrical full close position (the minimum opening degree on the control purpose) does not always agree with an idling opening degree (an opening degree necessary for idling rotating speed control). The reason is that because the opening degree of the throttle valve is feedback controlled based on an idling rotating speed detected signal in order to keep the idling rotating speed to a target rotating speed, and thereby the opening degree can not be determined uniquely.

In regard to a full open position, there are a mechanical full open position determined by a stopper and an electrical full open position of a maximum opening degree on control. Therein, in a case of simply describing a "full close position", meaning of the word includes the electrical full close position as well as the mechanical full close position. In a normal control, the throttle valve is controlled between the electrical full close position (the minimum opening degree on the control purpose) and the electrical full open position (the maximum opening degree on the control purpose). By doing so, a part of the throttle valve does not hit on the stoppers for determining the mechanical full close position and the mechanical full open position at controlling the throttle valve to the minimum and the maximum opening degrees. Therefore, mechanical fatigue, abrasion and damage of the stoppers and the gear members can be prevented and sticking of the throttle valve to the stopper can be prevented.

A default opening degree (that is, the initial opening degree in an off state of engine key) is set to an opening degree of a position in which the throttle valve is further opened wider than that in the full close position (the mechanical full close position and the electrical full close position)(for example, a position larger than the mechanical full close position by 4 to 13°). One reason why the default opening degree is set is that an air flow rate necessary for combustion of pre-warming-up operation at stating-up of the engine (cold starting-up) is secured without any auxiliary air passage (an air passage bypassing the throttle valve). During idling operation, as the engine is warmed up, the throttle valve is controlled so as to moved from the default opening degree toward the smaller opening degree. However, the lower limit is the electrical full close position. Another reason why the default opening degree is set is to cope with requirements for securing self-running (limp home) or for securing an intake air flow rate to prevent the engine operation from stopping even if the throttle control system is failed, for preventing the throttle valve from fixing to an inner surface of the throttle body with a viscous substance or ice.

As conventional examples of default opening degree setting mechanisms, various kinds of default opening degree setting mechanisms are proposed in, for example, Japanese Patent Application Laid-Open No. 63-150449, U.S. Pat. No. 4,947,815 and the corresponding patent of Japanese Patent Application Laid-Open No. 2-500677, Japanese Patent Application Laid-Open No. 62-82238 and the corresponding patent of U.S. Pat. No. 4,735,179 by the same applicant of the present invention, Japanese Patent Application Laid-Open No. 10-89096, Japanese Patent Application Laid-Open No. 10-131771 and so on.

There are various types of default opening degree setting mechanisms. For example, one type is that a default opening degree is secured by setting the relationship between forces of a returning spring for acting a force toward a closing direction of the throttle valve and an opposed spring (called as a default spring or an initial opening degree spring) for acting a force toward an opening direction of the throttle valve opposing against the force of the returning spring so that the force of the default spring is larger than the force of the returning spring at the default opening degree position and so that a free end of the default spring is stopped by a default stopper at the default opening degree position when the engine key is switched off (for example, Japanese Patent Application Laid-Open No.2-500677).

Another type is, as disclosed in Japanese Patent Application Laid-Open No. 1-131771, that a fixing side engaging element to be fixed to a throttle valve shaft (this engaging element may be constructed by a throttle lever, or a gear for transmitting motor power may be used instead of the engaging element) and a moving side engaging element (a linking lever) idly inserted onto the throttle valve shaft and rotatable relative to the throttle valve shaft are provided, and the moving side engaging element and the fixing side engaging element are linked together with a returning spring so as to attract each other, and a force is applied using a default spring onto the moving side engaging element in a direction of opening the throttle valve to engage and rotate the moving side engaging element and the fixing side engaging element (the throttle valve shaft) together opposing against the force of the default spring when the opening degree is within the range smaller than the default opening degree (smaller than the default stopper position), and to rotate only the fixing side engaging element and accordingly the throttle valve shaft opposing against the force of the returning spring and preventing movement of the moving side engaging element by the default stopper when the opening degree is within the range larger than the default opening degree. On the contrary, there is a type that the moving side engaging element and the fixing side engaging element are linked together with the default spring so as to attract each other, and a force is applied using the returning spring onto the moving side engaging element in a direction of closing the throttle valve to engage and rotate the moving side engaging element and the fixing side engaging element (the throttle valve shaft) together opposing against the force of the returning spring when the opening degree is within the range larger than the default opening degree, and to rotate only the fixing side engaging element (the throttle valve shaft) opposing against the force of the default spring and preventing movement of the moving side engaging element by the default stopper when the opening degree is within the range smaller than the default opening degree.

The electronic control throttle device can more accurately perform air flow rate control suitable for operation of an internal combustion engine than a mechanical throttle device in which an amount of stepping-in of the accelerator pedal is transmitted to a throttle valve shaft through an accelerator wire. However, since the electronic control throttle device has the electric drive actuator and the default opening degree setting mechanism, number of the parts is increased and accordingly it is important how to make the throttle body small in size, light in weight and simple in structure and how to simplify the wiring (wire harness).

Further, the electronic control throttle device controls the idling rotating speed by controlling opening degree of the throttle valve, but has the following point to be improved.

In a case where idling rotating speed control is performed with the throttle valve in the electronic control throttle device, an opening degree larger than the mechanical full close position by a certain angle (for example, 5 to 1°) is secured at least as the minimum opening degree on the control purpose. Since a gap (sometime called as a shaft support gap) between the throttle valve shaft and a shaft inserting through hole provided in a wall of the throttle body which guides the throttle valve shaft to a bearing practically serves as a part of the intake air passage and the air flow rate (leak air flow rate) flowing through the shaft support gap can not be controlled, the minimum opening degree on the control purpose is set with taking it into consideration that the leak flow rate flows into the internal combustion engine.

However, according to the conventional set value of the minimum opening degree for the control purpose (the electrical full close position), when the throttle valve is closed from the maximum opening degree for the control purpose (the electrical full open position) toward the minimum opening degree (the electrical full close position, in the idling state), a magnitude of overshoot becomes larger than the minimum opening degree in the closing direction (the overshoot is approximately 1.5° at maximum) because the driving force of the motor (the electric drive actuator) is decreased at high temperature or at low temperature (that is, the torque of the motor is reduced at high temperature due to increase in the resistance of the motor, and the torque of the motor is reduced at low temperature due to decease in the battery voltage). As a result, as shown by a solid line ① in FIG. 17, the throttle valve hits on the stopper at the mechanical full close position (the diagonally shaded area in FIG. 17 indicates a state that movement of the throttle valve is blocked by the full close stopper.), and over-current flows in the motor likely to cause an erroneous fail-safe diagnosis (an erroneous diagnosis judging of occurrence of failure in the motor from the over current) or decrease in the lifetime of the motor.

SUMMARY OF THE INVENTION

An object of the present invention is to make an electronic control throttle device having an electric drive actuator, a gear mechanism, a default opening degree setting mechanism small in size, light in weight and simple in assembling and wire harness by solving the above-mentioned problems.

Another object of the present invention is to improve reliability of the electronic control throttle device by preventing the throttle valve from hitting on the stopper even if such an overshoot as described above occurs in the throttle valve.

The present invention is basically constructed as follows.

A throttle device for an internal combustion engine according to one aspect of the present invention includes an electric drive actuator and a default opening degree setting mechanism, wherein a gear case for containing a gear mechanism to transmit power of the electric drive actuator to a throttle valve shaft is arranged on an outer wall of a throttle body, and a returning spring for acting a spring force on the throttle valve in a closing direction and a spring (a default spring) for acting a spring force on the throttle valve in a direction toward a side of the default opening degree seeing from the full close position of the throttle valve have diameters different from each other, and both of the springs are held around a shaft of said throttle valve shaft and arranged between a gear attached to the throttle valve shaft in the gear mechanism and a wall portion of the throttle body.

According to the above-mentioned construction, the returning spring and the default spring can be intensively arranged between the gear provided in the throttle shaft and the wall portion of the throttle body, and accordingly the part space can be rationalized. Particularly, according to the present invention, by arranging the returning spring and the default spring in such a feature that at least a part of the returning spring and a part of the default spring are overlapped with each other (one spring having a smaller diameter is inserted inside the other spring having a larger diameter), an arranging space in a longitudinal direction of the springs can be shortened, and accordingly this structure is useful in that the gear case and the whole throttle body can be made small in size, light in weight and simple in assembling.

In addition to the above-mentioned construction, the present invention proposes a construction that the spring arranged outside out of the returning spring and the default spring (the spring having the larger diameter) is placed in being guided by an outer periphery of a bearing containing boss for the throttle valve shaft projecting inward of the gear case in a manner that one end of the spring having the larger diameter is fixed to the wall portion of the throttle body. By doing so, the outer periphery of the bearing containing boss for the throttle valve shaft can be used for a space placing one spring out of the returning spring and the default spring. Accordingly, this structure is useful in that the parts can be more intensively arranged, and the throttle body can be made smaller in size and light in weight. Although the other various dependent invention in regard to the first invention are proposed, these will be described in the item of DESCRIPTION OF THE PREFERRED EMBODIMENTS later.

In an electronic control throttle device according to another aspect of the present invention, a throttle body, a motor case containing a motor composing an electric drive actuator and a containing portion of a connector connecting by plugging to a motor terminal provided in an end plate of said motor are formed in a unit. In addition, a motor terminal extracting port for exposing the motor terminal to the containing portion of the connector is formed on a bottom portion of the motor case, and a guide for guiding the connector to the motor terminal extracting port when the connector is plugged to the motor terminal is formed on an inner wall surface of the containing portion of the connector.

By constructing as described above, the connector can be easily connected to the motor terminal without difficulty of positioning the connector to the motor terminal because by containing the motor in the motor case the motor terminal can be seen in the containing portion of the connector (the terminal connector) through the terminal extracting port, and in this state the terminal connector is inserted from the terminal containing portion using the guide. Even if the motor terminal is, particularly, placed in a deep position of the connector containing portion and behind the other parts, the connector can be inserted by being guided by the above-mentioned guide without difficulty while being positioned.

In an electronic control throttle device according to a further aspect of the present invention, a motor case for containing a motor composing the electric drive actuator is integrated with a throttle body in a unit. In addition, in the throttle body, a motor terminal extracting port is formed in a side of a bottom portion of the motor case, a containing space of a connector to be connected to the motor terminal being formed adjacent to the side of the bottom portion of said motor case, the containing space of the connector and a containing space for containing a throttle sensor provided at one end of a throttle valve shaft being formed in one room, a wire lead portion of the throttle sensor being arranged in being directed to the containing space of the motor terminal connector.

By constructing as described above, the wires led from the terminal of the throttle sensor and the wires led from the motor terminal can be merged at adjacent positions in the beginning in the connector and throttle sensor containing space (one room), and accordingly these wires can be gathered without difficulty and can be extracted out of the throttle body. Therefore, this construction is useful to simplify the wiring work and the part assembling work.

An electronic control throttle device according to a further aspect of the present invention, a motor case for containing a motor composing the electric drive actuator and a gear case for containing a gear mechanism to transmit power of the motor to a throttle valve shaft are integrated in a unit. In addition, a motor inserting port of the motor case is opened to the gear case, the motor being attached to the motor case by fastening a motor bracket to triangular point arranged screw holes provided a periphery of the motor inserting port with three screws in total, three sides forming a contour of the motor bracket being curved lines, a motor positioning portion fitting to the three curved lines of the motor bracket to position the motor being formed in the gear case.

By constructing as described above, vibration of the motor can be suppressed more effectively than in a conventional one in which the motor bracket is fastened at two points with screws, and further accuracy of positioning the motor can be improved.

An electronic control throttle device according to a further aspect of the present invention includes an electric drive actuator for opening and closing a throttle valve based on a signal controlling an intake air flow rate of the internal combustion engine. In addition, a gap (a shaft supporting gap) between a throttle valve shaft and a shaft inserting through hole for guiding the throttle valve shaft to a bearing provided in a wall portion of a throttle body is filled with an air leak preventing material, and a minimum opening degree on control purpose of the throttle valve is set to a value larger than an amount of overshoot of the throttle valve occurring when opening degree of the throttle valve is changed from a maximum opening degree on control purpose of the throttle valve to the minimum opening degree.

By constructing as described above, since the intake air flow rate (the leak air flow rate) supplied to the internal combustion engine through the so-called shaft supporting gap of the throttle valve shaft can be eliminated, the minimum opening degree on the control purpose of the throttle valve can be increased larger than in the conventional one by that amount. In the present invention, by making use of this fact the minimum opening degree on the control purpose is set a value lager than the overshoot of the throttle valve when opening degree of the throttle valve is changed from the maximum opening degree on control purpose of the throttle valve to the minimum opening degree. For instance, by applying the air leak preventing material (for example, molybdenum disulfide), as shown by the solid line ② in FIG. 17, since the minimum opening degree on the control purpose can be set a value lager than the mechanical full close position by approximately 2°, the minimum opening degree on the control purpose can be increased higher by a value corresponding to the overshoot (for instance, approximately 1.5°) when opening degree of the throttle valve is changed from the maximum opening degree on control purpose (the electrical full open position) to the minimum opening degree (the electrical full close position). Therefore, the stopper blocking element in the side of the throttle valve can be prevented from hitting on the stopper (the full close stopper) determining the mechanical full close position even if the overshoot occurs. Accordingly, even if the overshoot occurs, it is possible to prevent over current from flowing in the motor.

The above-mentioned operation and effect are attained on the premises that the gap (the shaft supporting gap) between the throttle valve shaft and the shaft inserting through hole for guiding the throttle valve shaft to the bearing provided in the wall portion of the throttle body is filled with the air leak preventing material. The above-mentioned operation and effect can not be expected in a mechanical throttle device in which a stepping amount of an accelerator is transmitted to a throttle valve shaft through an accelerator wire even if the so-called shaft supporting gap is filled with the air leak preventing material. The reason is as follows. The idling opening degree in the mechanical throttle device is set to a position where a mechanical full closing stopper exists, and the mechanical throttle device is designed on the premises that the stopper blocking element controlling the throttle valve hits on the full close stopper during operation. Further, since the throttle valve is mechanically driven using the accelerator wire, there is no occurrence of overshoot nor occurrence of over current attendant on the overshoot differently from in the electronic control throttle device.

The Japanese Patent Application Laid-Open No. 62-17100 proposes a technology that in a mechanical throttle device, a dryable liquid lubricant (for example, molybdenum disulfide) is penetrated into an air passage formed between a throttle valve shaft and a shaft inserting through hole in a wall portion of the throttle valve assembly (the shaft supporting gap) and dried to fill the air passage with the lubricant solidified and fixed to the air passage. On the background that an idling rotating speed of an engine is set in taking the amount of the air flowing through the so-called shaft supporting gap into consideration since the air flowing through the gap can not be controlled by the throttle valve, but the idling rotating speed is gradually decreased and finally the engine may be stopped because combustion products (combustion soot, viscous substance or the like) are gradually accumulated in the shaft supporting gap. Therefore, the setting of the idling rotating speed is performed by eliminating the gap in the beginning to eliminate the change in the idling air flow rate with time and by using a full close stopper (an idling adjust screw).

In the electronic control throttle type, the idling rotating speed control can be performed by controlling the throttle valve opening degree through feedback control (that is, the idling opening degree is not determined using the idling adjusting screw used in the mechanical throttle device). Therefore, even if combustion products are gradually accumulated in the shaft supporting gap of the throttle valve shaft, decrease in the air flow rate (decrease in the idling rotating speed) caused by the accumulation of the combustion products can be compensated by controlling the throttle valve opening degree. From this point of view, the above-mentioned problem specific to the mechanical throttle device (the problem of the decrease in idling rotating speed caused by accumulation of combustion products in the shaft supporting gap) does not occur in the electronic control throttle device. In other words, there are differences in problem to be solved and in object between the air leak preventing material applied to the shaft supporting gap in the electronic control throttle device and the air leak preventing material applied to the shaft supporting gap in the mechanical throttle device.

In an electronic control throttle device according to a further aspect of the invention, an electromagnetic shield member of a wire used for driving control of the electric drive actuator is a woven shield composed of a tube-shaped member formed by weaving glass fiber and a woven thin metal wire member covering the tube-shaped member.

A conventional electromagnetic shield member of this kind is formed by covering a tube made of silicon rubber with a shielding outer cover of woven thin metal wires. The electromagnetic shield member of the above-mentioned structure can substantially reduce its cost and can effectively shield electromagnetic wave compared to the conventional electromagnetic shield member.

DETAILED DESCRIPTION OF THE PREFERRED EMBODIMENTS

Embodiments of the present invention will be described below, referring to the accompanied drawings.

Figure 1A:
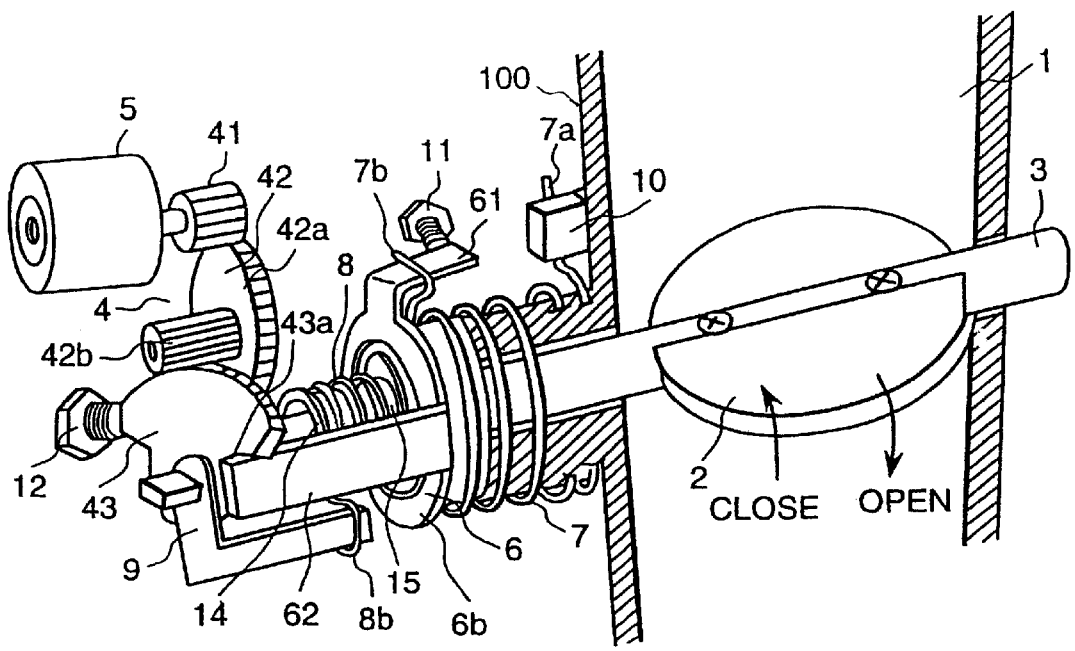
FIGS. 1A and 1B each is a perspective view showing a first embodiment of an electronic control throttle device in accordance with the present invention and a view explaining the principle.

Initially, the principle of an embodiment of an electronic control throttle device with a default mechanism (a throttle device of an internal combustion engine for a vehicle) in accordance with the present invention will be described below, referring to FIGS. 1A and 1B. FIG. 1A is a schematic perspective view showing an electric drive mechanism of throttle valve and a default mechanism in the present embodiment, and FIG. 1B is an explanatory view equivalently expressing the above-mentioned mechanisms.

Figure 1B:
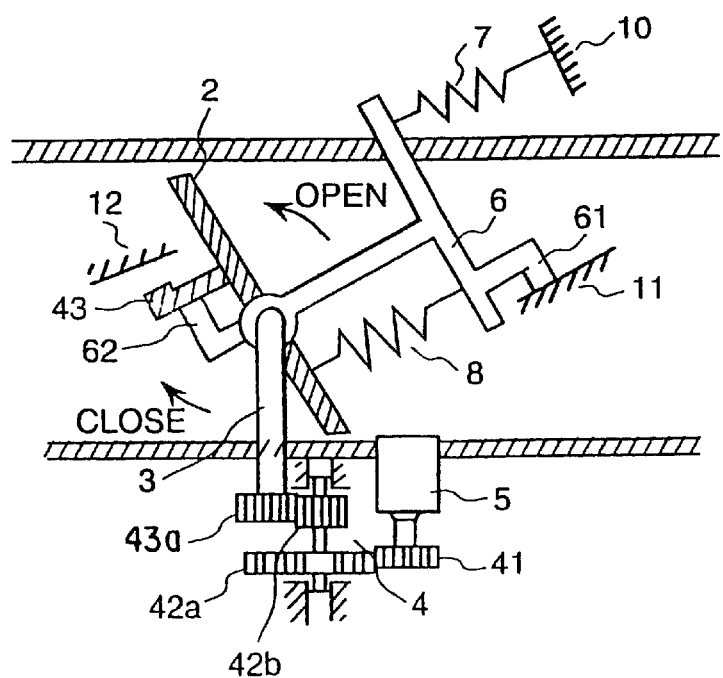

Referring to FIGS. 1A and 1B, a flow rate of air flowing in an intake air passage 1 is adjusted corresponding to an opening degree of a disk-shaped throttle valve 2. The throttle valve 2 is fixed to a throttle valve shaft 3. In one end of the throttle valve shaft 3, a final stage gear (referred to as a throttle gear) 43 of a gear mechanism (a reduction gear mechanism) 4 for transmitting power of a motor (an electric drive actuator) 5 to the throttle valve shaft 3 is attached. The gear mechanism 4 is composed of a pinion gear 41 attached to the motor 5 and an intermediate gear 42 in addition to the throttle gear 43. The intermediate gear 42 is composed of a large diameter gear 42a engaging with the pinion gear 41 and a small diameter gear 42b engaging with the throttle gear 43, and is rotatably inserted into a gear shaft 70 fixed to a wall surface of a throttle body 100.

The motor 5 is driven corresponding to an accelerator signal in regard to a stepping amount of an accelerator pedal and a traction control signal, and the power of the motor is transmitted to the throttle valve shaft 3 through the gears 41, 42, 43.

The throttle gear is a sectorial gear and fixed to the throttle valve shaft 3, and also serves as a fixed side engaging element, to be described later, in order to reduce number of parts, and has an engaging side 43a for engaging with an arm portion 62 of an engaging lever (a moving side engaging element) 6 to be described later.

The engaging lever 6 is used for a default opening degree setting mechanism, and therefore, is hereinafter referred to as a default lever. The default lever 6 is idly inserted onto the throttle valve shaft 3 and rotatable relative to the throttle valve shaft, and is an engaging element in the moving side to the above-mentioned fixing side engaging element (gear) 43. The fixing side engaging element (gear) 43 and the moving side engaging element (the default lever) 6 are attracted to each other through a default spring 8 by connecting between a spring fastening portion (shown by a reference character 64 in FIG. 2) of the default lever 6 and a spring fastening portion 9 fixed to the throttle valve shaft 3 with the default spring 8.

A returning spring 7 is fixed to a spring fastening portion 10 fixed to the throttle body 100 in one end, and the other end of a free end side is hooked to a spring fastening portion 61 provided in the default lever 6 to act a force on the moving side engaging element (the default lever) 6 in a direction closing the throttle valve.

A full close stopper 12 is for determining a mechanical full close position of the throttle valve. When the throttle valve 2 is rotated toward a closing direction up to the mechanical full close position, one end of the stopper fixing element (herein, the throttle gear 43 also serving) fixed to the throttle valve shaft 3 is in contact with the stopper 12 to block the throttle valve to be closed further. A stopper (sometimes called as a default stopper) 11 for setting a default opening degree is for keeping the opening degree of the throttle valve 2 to a preset initial opening degree (a default opening degree) larger than the mechanical full close position and the electrical full close position (a minimum opening degree on the control purpose) when an engine key is off (when the electric drive actuator is off). The spring fastening portion 61 provided in the default lever 6 is in contact with the default stopper 11 when the throttle valve is in the default opening degree to block the throttle valve to rotate toward a direction decreasing the opening degree of the default lever 6 (a closing direction). The full close stopper 12 and the default stopper 11 are constructed by adjustable screws (adjust screws) provided in the throttle body 100.

By constructing as described above, the fixing side engaging element (the throttle gear) 43 and the moving side engaging element (the default lever) 6 are set rotatable in being engaged together opposing against the force of the returning spring 7 within the range of opening degrees above the default opening degree. The moving side engaging element (the default lever) 6 is set to be blocked to move by the default stopper 11 and only the fixing side engaging element (the throttle gear) 43 is set rotatable opposing against the force of the default spring 8 together with the throttle valve shaft 3 within the range of opening degrees below the default opening degree.

For example, in FIGS. 1A and 1B, the engine key is in off state, and in this state the default lever 6 is pushed back up to the position in contact with the default stopper 11 by the force of the returning spring 7, and the throttle gear 43 and the throttle valve shaft 3 are kept to be engaged with the default lever 6 and are at a position corresponding to the default opening degree by receiving the force of the returning spring 7 through the arm portion of the default lever 6. Therefore, a preset gap is maintained between the throttle gear (the stopper stopping element) 43 and the full close stopper 12.

When the throttle valve shaft 3 is rotated from this state toward the opening direction by the motor 5 through the gear mechanism 4, the throttle gear 43 transmits power in the opening direction to the default lever 6 through an engaging portions 43a and the arm portion 62 opposing against the force of the returning spring 7 to open the throttle valve 2 up to a position where the power balances with the forces of the returning spring 17.

On the contrary, when the throttle valve shaft 3 is rotated from this state toward the closing direction by the motor 5 through the gear mechanism 4, the default lever 6 (the arm portion 61) follows the rotation of the throttle gear 43 and the throttle valve shaft 3 until the default lever 6 is in contact with the default stopper 11. When the default lever 6 is in contact with the default stopper 11, only the throttle gear 43 and the throttle valve shaft 3 are operated opposing against the force of the default spring 8 within the range below the default stopper 11 (the default opening degree) since the default lever 6 is blocked to rotate in the closing direction below the default opening degree. The throttle gear (the stopper stopping element) 43 is brought in contact with the full close stopper 12 at the mechanical full close position by driving the motor 5 only when the reference point on the control purpose is checked, and accordingly the throttle gear 43 is normally not brought in contact with the full close stopper 12.

In this default method, the spring force of the returning spring 6 is effective only within the range above the default opening degree due to existence of the default stopper 11. Therefore, since the spring force of the default spring 8 can be set within the range below the default opening degree without being affected by the spring force of the returning spring 6, there is an advantage in that load of the default spring is made small and accordingly the torque required for the electric drive actuator can be reduced and the electric load to the engine can be reduced.

In this embodiment, the returning spring 7 and the default spring 8 are formed in coil-shaped torsion springs, and the diameter of the returning spring 7 is made larger than the diameter of the default spring 8, and these springs 7, 8 are held around the shaft of the throttle valve shaft 3 and placed between the throttle gear 43 and a wall portion of the throttle body 100. By doing so, the default spring 8 and the returning spring 7 are partly overlapped in a nearly coaxial cylinder shape (that is, a part of the default spring 8 is inserted into the inside of the returning spring 7.)

In FIG. 1A, lengths of the arm portions 61, 62 of the default lever 6 and the arm of the stopping portion 9 are exaggeratively drawn for convenience of drawing the figure, but actually the springs 7, 8 are used by a compressed state. Accordingly, the spring lengths in the axial direction are short and correspondingly the arms are formed in short projecting portions (refer to the exploded equipment shown in FIG. 2).

Figure 3:
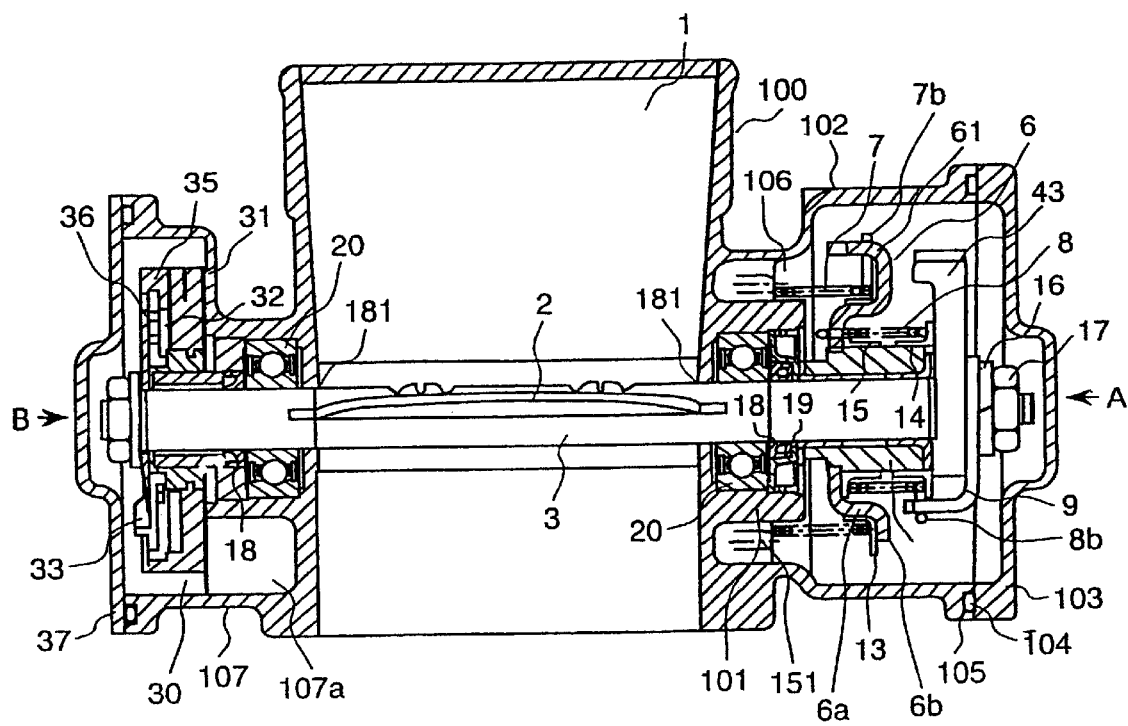
FIG. 3 is a vertical cross-sectional view of the first embodiment.
Figure 4:
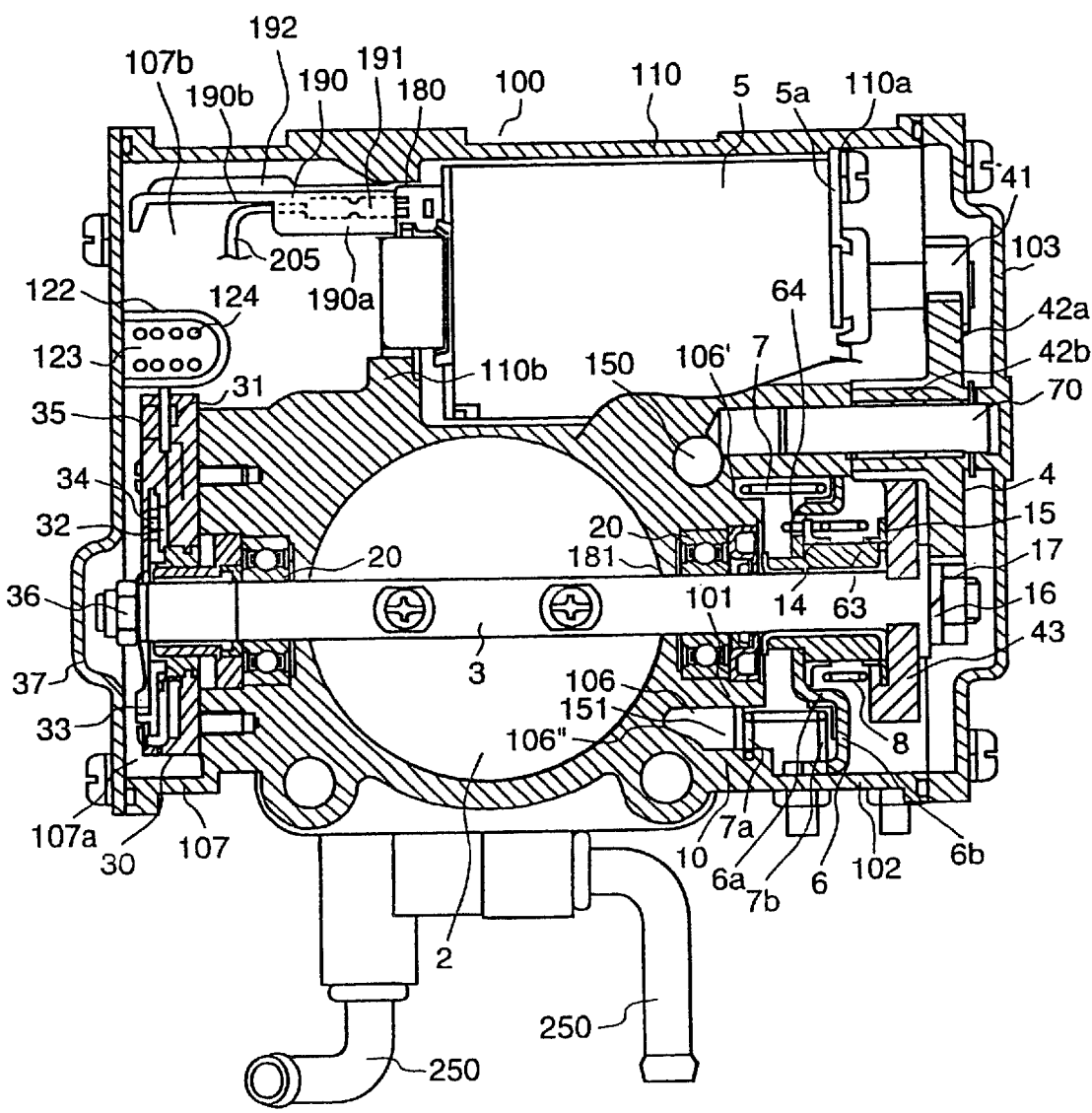
FIG. 4 is a transverse cross-sectional view of the first embodiment.

FIG. 3 is a cross-sectional view in the axial direction of the air flow passage 1 of the electronic control throttle device in accordance with the present invention, and FIG. 4 is a cross-sectional view in the direction perpendicular to the axis of the air flow passage 1 of the electronic control throttle device seeing from the upstream side.

As shown in these figures, a gear case 102 for containing the gear mechanism 4 is formed on one side wall of the throttle body 100 integrally with the throttle body, and a bearing containing boss 101 for containing one of bearings 20 of the throttle valve shaft 3 is arranged in projecting on an outer wall of the throttle body 100 inside the gear case 102. The bearing 20 is sealed by a seal member 18 supported by a seal bush 19. A spring (in this case, the returning spring) 7 out of the springs 7, 8 arranged outside (having a larger diameter) is fixed to the spring fastening portion 10 (refer to FIG. 1, FIG. 2, FIG. 3) of the throttle body 100 in one end 7*a*, and a part of the spring in the side of the one end 7*a* is guided on the outer periphery of the boss 101.

In this embodiment, an annular groove 106 receiving a part of the returning spring 7 is formed between the outer periphery of the bearing containing boss 101 in the side of the gear case 102 and the inner wall of the gear case 102. The bottom portion of the annular groove 106 is not even in depth because of securing positions for attaching holes 150, as shown by the reference characters 106', 106", in FIG. 4. Therefore, a plurality of ribs 151 are arranged in the circumferential direction of the annular groove 106 so as to receive the returning spring 7 at a constant level of depth of the annular groove 106. If the bottom portion of the annular groove 106 is even, the above-described ribs 151 can be eliminated and the returning spring 7 can be inserted a more deeper level of the annular groove 106.

The default lever (the moving side engaging element) 6 is a disk shape having the arms 61, 62, and one surface of the default lever receives one end of the default spring 8 and the other surface in the opposite side receives one end of the default spring 8.

The default lever (the moving side engaging element) is composed of a cylinder portion with bottom 6*a* having an inner diameter slightly larger than an outer diameter of a spring 8 having a smaller diameter out of the default spring 8 and the returning spring 7 and a portion 6*b* formed in the peripheral edge of an opening of the cylinder portion with bottom 6*a*, and a part of the spring 8 having a smaller diameter is inserted inside the cylinder portion with bottom 6*a* and received by the bottom of the cylinder portion with bottom 6*a*. On the other hand, a part of the spring 7 having a larger diameter is inserted on the outer periphery of the cylinder portion with bottom 6*a* and received by one surface of the portion 6*b*.

The default lever 6 is joined with a sleeve 63 inserted on the throttle valve shaft 3 in a unit, and holders (collars) of the default spring 8 is inserted on the outer periphery of the sleeve 63 between the throttle gear 43 and the default lever 6.

That is, The default lever (the moving side engaging element) 6 is placed between the wall portion of the throttle body 100 and the gear (the fixing side engaging element) 43, and the cylindrical collar divided into two members 14, 15 in the axial direction is placed between the inner periphery of the default spring 8 between the default lever 6 and the gear 43 and the outer periphery of the throttle valve shaft 3.

In a case where the collar is divided into the members 14, 15 as described above, there is an advantage as described below compared to in a case of forming the collar with one collar member. That is, when the throttle valve shaft 3 is rotated from the default opening degree toward the full open direction opposing against the force of the default spring 8, forces in directions opposite to each other are generated at the both ends of the default spring 8 caused by torsion. Therefore, when the collar member to serve as the spring holder is formed in one member, a large friction force caused by the torsion acts on the collar member from the returning spring. As a result, the collar member may be worn and damaged. On the other hand, when the collar member is divided into the members 14, 15 in the axial direction, the collar members 14, 15 follow movement of each end portion of the default spring 8, and the collar members do not receive an excessive force from the spring. Accordingly, the wear and damage described above can be prevented.

Figure 2:
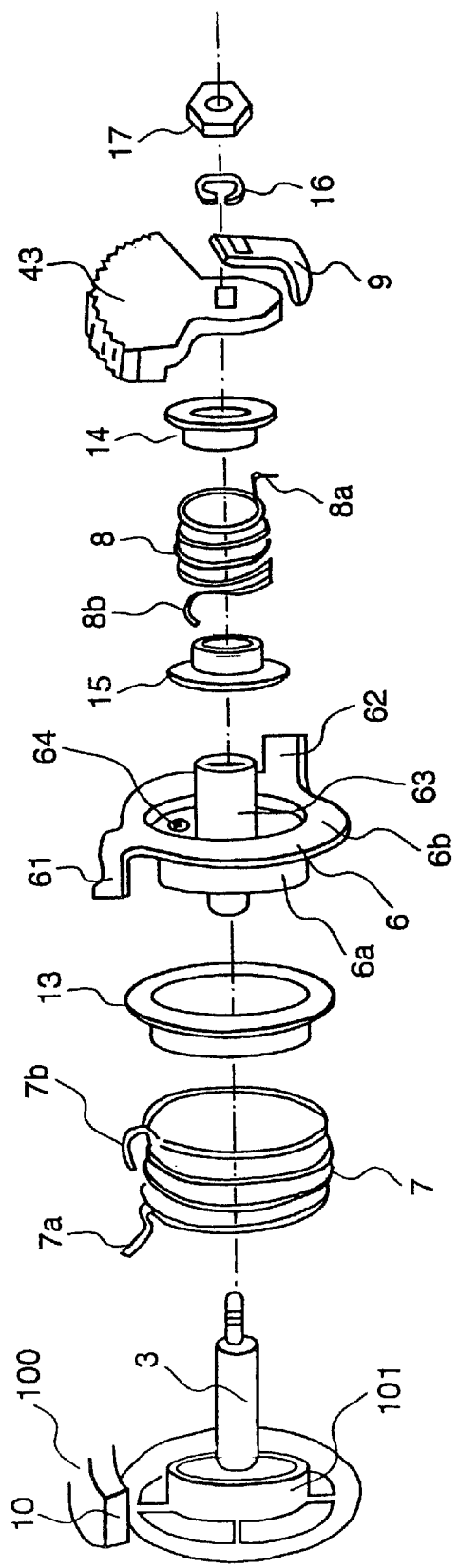
FIG. 2 is an exploded perspective view showing a part of the first embodiment of the electronic control throttle device.

As shown in FIG. 2, the returning spring 7, the spring holder 13, the default lever 6, the collar member 14, the default spring 8, the collar member 15, the throttle gear 43, the spring fastening member 9 can be successively assembled through one end of the throttle valve shaft 3, and then the springs 7, 8 can be placed in compression states by fastening the nut 17 through a washer 16.

Figure 7:
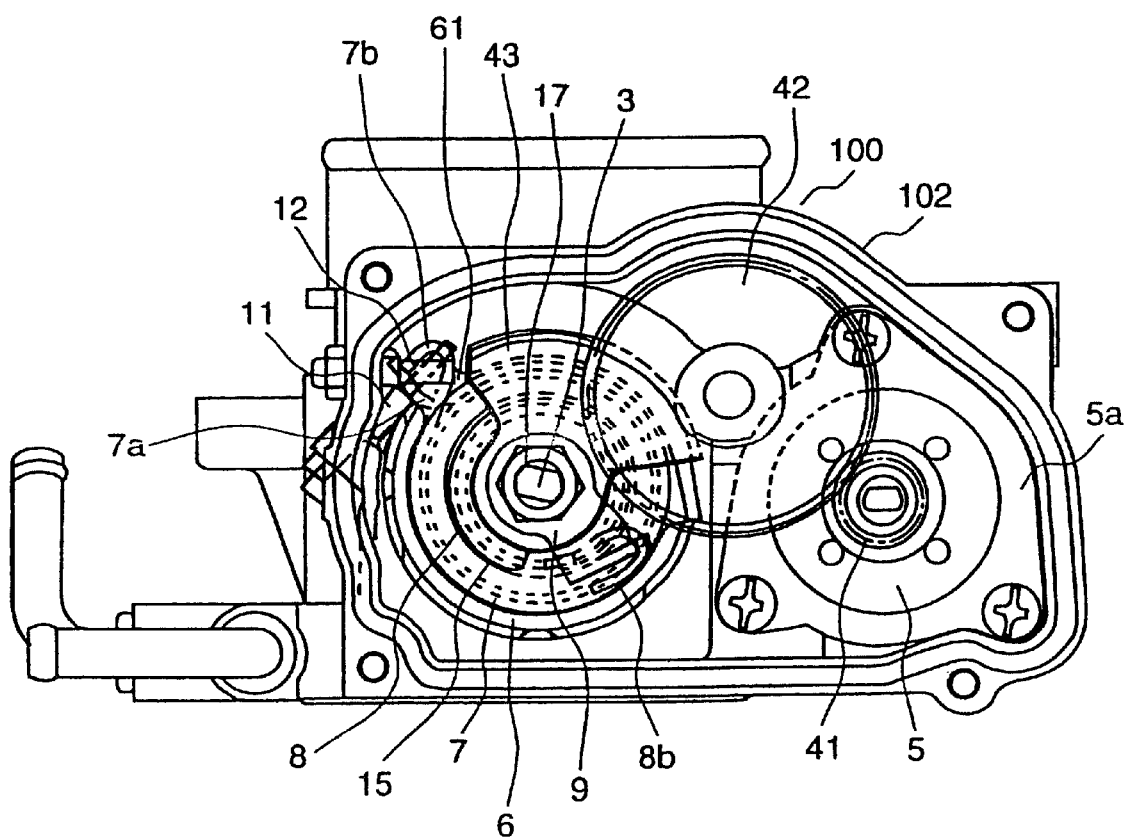
FIG. 7 is an explanatory view showing a gear case detaching its cover, the gear case being provided in the throttle body of the first embodiment.

FIG. 7 is a view showing the gear case 102 removing a gear cover 103 and seeing from a direction shown by an arrow A of FIG. 3. As described above, the default spring 8 and the returning spring 7 are nearly coaxially arranged partially overlapping and displacing in the axial direction around the throttle valve shaft 3. The diameter of the throttle gear 43 is made larger than the outer diameter of the returning spring 7 placed outside out of the default and returning springs so that the returning spring does not interfere with the other parts, and the throttle gear 43 and the smaller diameter gear 42*b* of the intermediate gear 4 are engaged with each other without difficulty.

The default stopper 11 and the full close stopper 12 are attached on the side wall of the gear case in the throttle body 100.

Main effects in regard to the construction having been described above are as follows.

The returning spring 7 and the default spring 8 can be intensively arranged between the gear 43 provided in the throttle valve shaft 3 and the wall portion of the throttle body 100. Particularly, by the structure that the returning spring 7 and the default spring 8 are arranged partially overlapping in the axial direction of the throttle valve shaft (the structure of arranging the springs 7, 8 in parallel in the radial direction), the arranging space in the longitudinal direction of the spring can be shortened (that is, the spring receiving structure of the default lever 6 makes a part of the returning spring 7 and a part of the default spring 8 overlapped in the axial direction), and further, the returning spring 7 is guided on the outer periphery of the bearing containing boss 101 for the throttle valve projecting toward the inside of the gear case 102 to use the outer periphery of the bearing containing boss 101 for the arranging space of the returning spring 7. In addition, the gear 43 also serves as the stopper stopping element. Therefore, the parts are substantially made intensive and rational by the multiplier effect of the above to contribute to making the gear case 10 and the whole throttle body 100 small in size, light in weight and simplifying assembling the throttle body.

The motor case 110 integrated with the throttle body 100 has a motor inserting port 110*a* opening to the inside of the gear case 102.

Figure 8A:
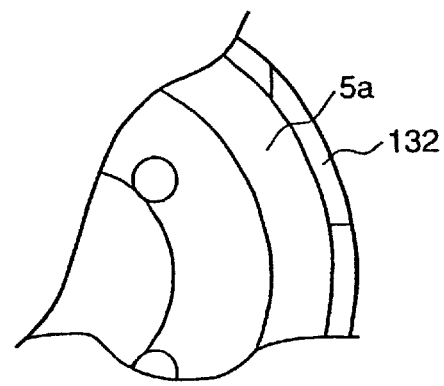
FIGS. 8A and 8B each is an explanatory view showing the gear case of FIG. 7 detaching part of the gears.
Figure 8B:
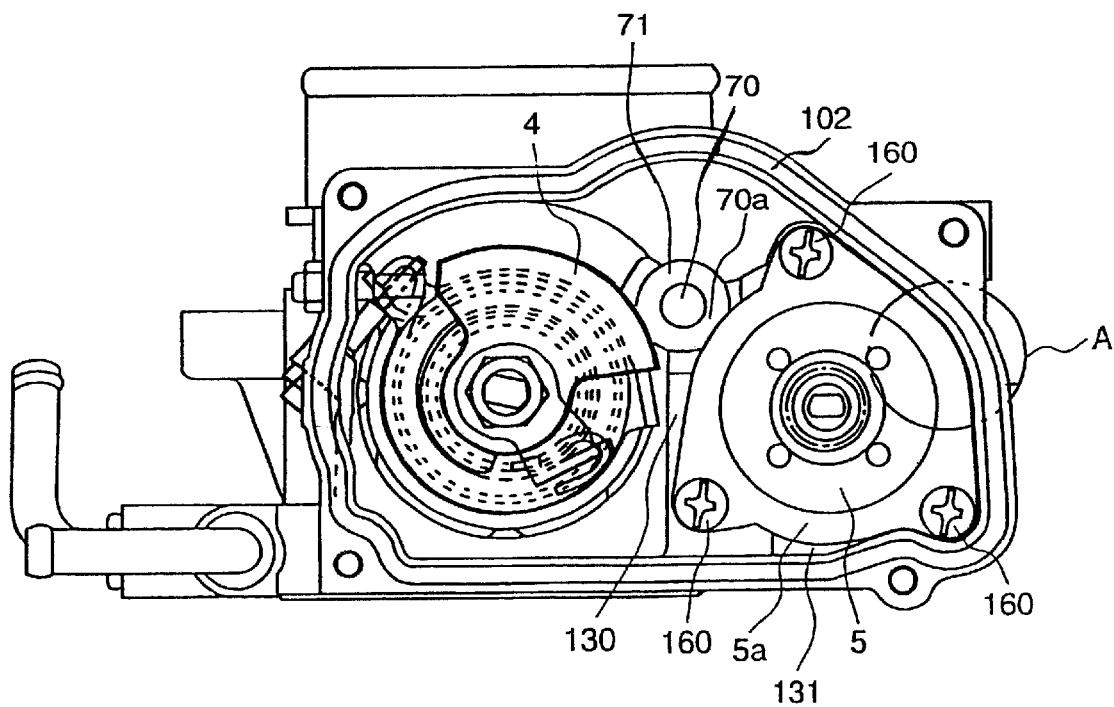

FIGS. 8A and 8B each is a view showing the inside of the gear case 102 by removing the intermediate gear 42. In order to suppress vibration of the motor more effectively than a conventional one in which the motor bracket is fastened at two points with screws, and to improve accuracy of positioning, the motor is designed as follows. That is, a contour of the motor bracket 5*a* is nearly triangular, and three sides forming the contour of the motor bracket are curved lines. The motor bracket 5*a* is attached to the motor case by fastening to triangular point arranged screw holes provided a periphery of the motor inserting port 110*a* with three screws 160 in total, and motor positioning portions 130, 131, 132 for positioning the motor by fitting to the three curved lines of the motor bracket 5*a* to position the motor being formed in the gear case 102. The inside of the motor positioning portions 130, 131, 132 has nearly equal curvature to the above-mentioned three sides of the curved lines of the motor bracket 5*a*. Further, a part 70*a* of the outer periphery of a cylindrical portion 71 supporting the intermediate gear attaching shaft 70 also has a cut-off portion so as to trace a line extending the curved line of the above-mentioned motor positioning portion 130. The cut-off line 3*a* is also used as a part of curved line for positioning the motor, and accordingly the motor can be placed near the gear mechanism 4 side by the distance to improve the part configuration.

A throttle sensor 30 for detecting throttle opening degree is attached to the other end of the throttle valve shaft 3 (an end in the side opposite to the gear mechanism 4 and the default opening degree setting mechanism). The throttle sensor 30 is composed of a sensor housing 31, a board 32 provided in the housing 31, a rotor 33, a brush 34 provided in the rotor 33 and a cover 35, and the sensor housing 31 having the board 32 is attached to the side wall of the throttle body 100 with screws in a state of inserting on to one end of the throttle valve shaft 3. On the other hand, the rotor having the brush 34 is fit to the throttle valve shaft 3 and fixed to the throttle valve shaft 3 fastened with a nut 36 so as to rotate together with the throttle valve shaft 3. By sliding a printed resistor on a board 32 with the brush 34 by rotation of the rotor 33, an opening degree signal of the throttle valve is electrically output through a lead wire.

By providing the throttle sensor 30, a case 107 for containing the throttle sensor 30 is formed on the side wall of the throttle body 100 in the side opposite to the gear case 102. The case 107 also has a containing space (a containing portion) 107*b* for a connector 190 of lead wires (electric power supply wires) 205 to be connected to a terminal 51 (refer to FIG. 10, FIG. 11) in addition to a containing space 107*a* for the throttle sensor 30, and the sensor containing space 107*a* and the connector containing space 107*b* are constructed in one room without boundary. Therefore, here, the case 107 is called as a connector and throttle sensor case.

Figure 10:
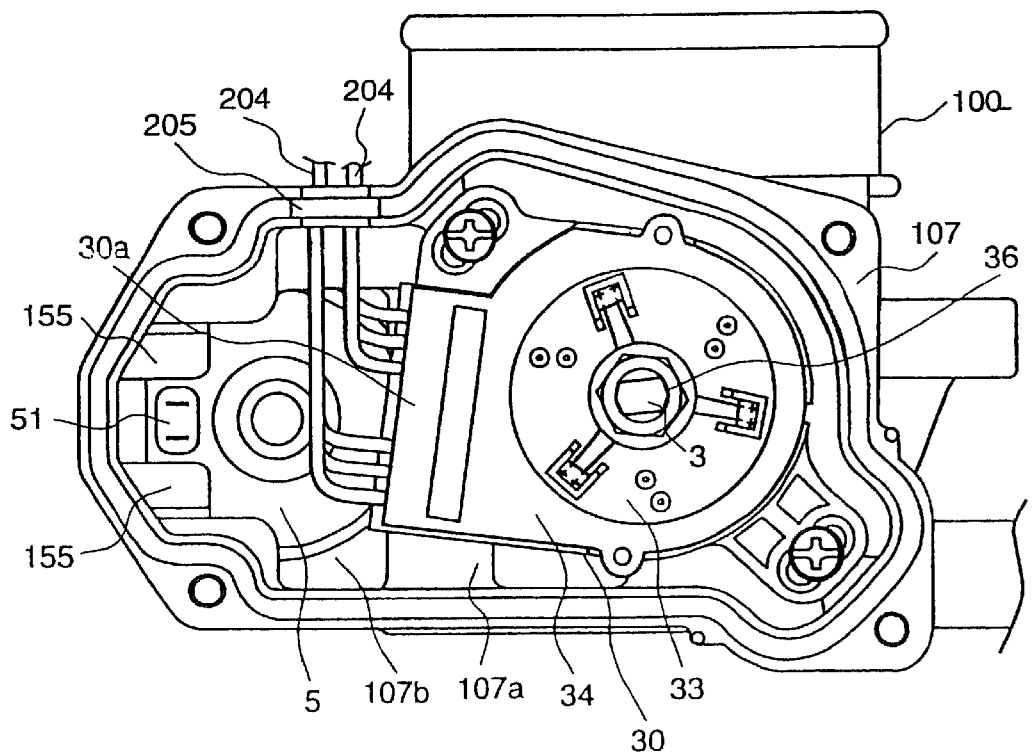
FIG. 10 is an explanatory view showing a connector and throttle sensor case detaching its cover, the connector and throttle sensor case being provided in the throttle body of the first embodiment.

As shown in FIG. 4, the motor case 110 provided in the throttle body 100 and the connector and throttle sensor case 107 are arranged so as to intersect each other at right angle, and a motor terminal extracting port 180 is formed in the side of the bottom portion 110*b* of the motor case 110, and the containing space 107*b* for the connector 190 is formed adjacent to the side of the bottom portion 110*b* of the motor case. By forming the sensor containing space 107*a* and the connector containing space 107*b* as one room, as shown in FIG. 10 (FIG. 10 is a view showing the throttle sensor case 107 of the throttle body 100 removing the case cover 37 and looking from the direction shown by an arrow B of FIG. 3), the wire lead portion 30*a* of the throttle sensor 30 is arranged so as to directed to the motor terminal connector containing space 107*b*.

The throttle sensor 30 has two sensor detecting portions of same type in order to back up the sensor when one of the sensor detecting portions produces trouble, and accordingly there are two set of the wires 204 extracted from the sensor 30.

Figure 5:
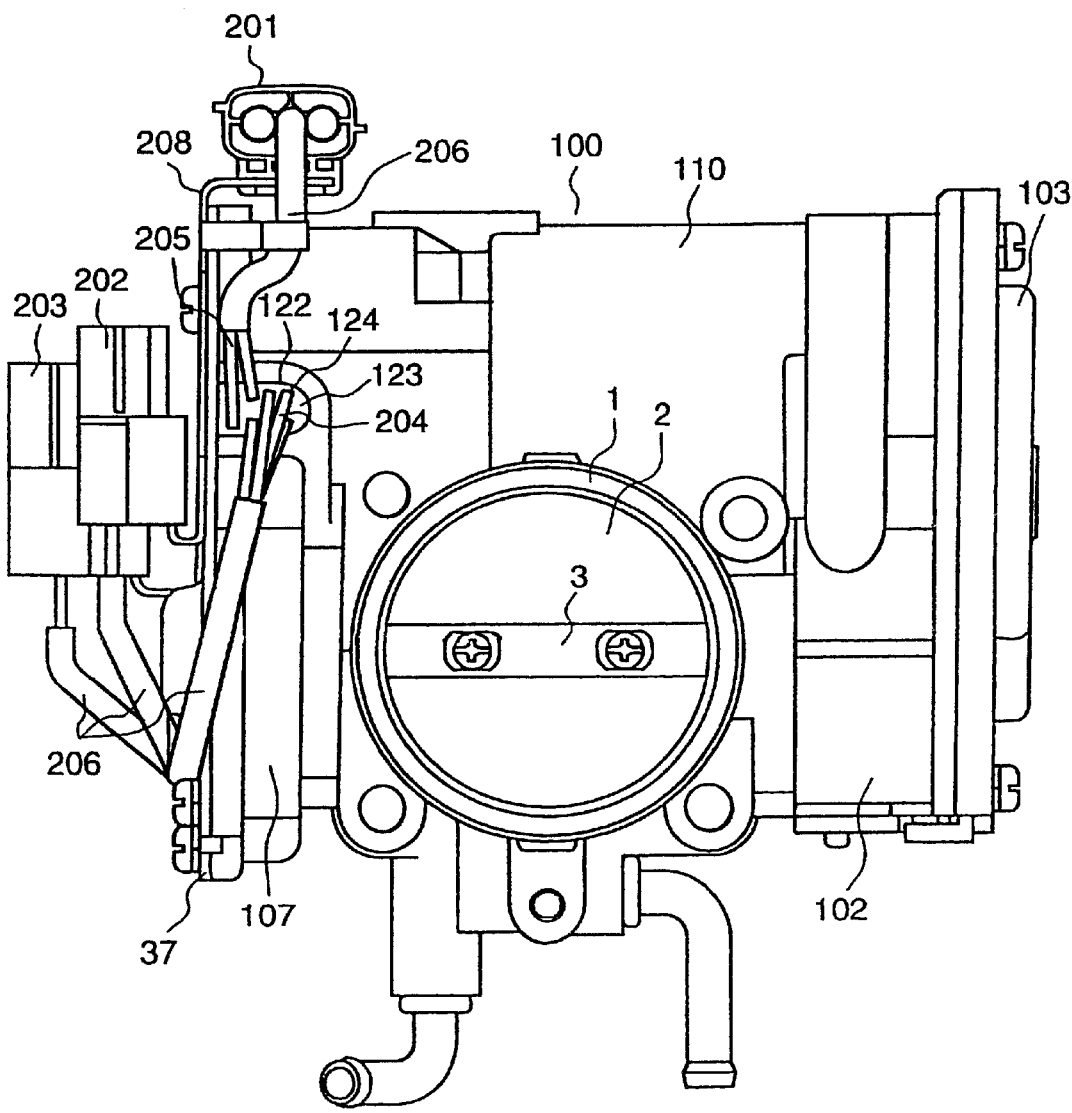
FIG. 5 is a front view of the first embodiment.
Figure 6:
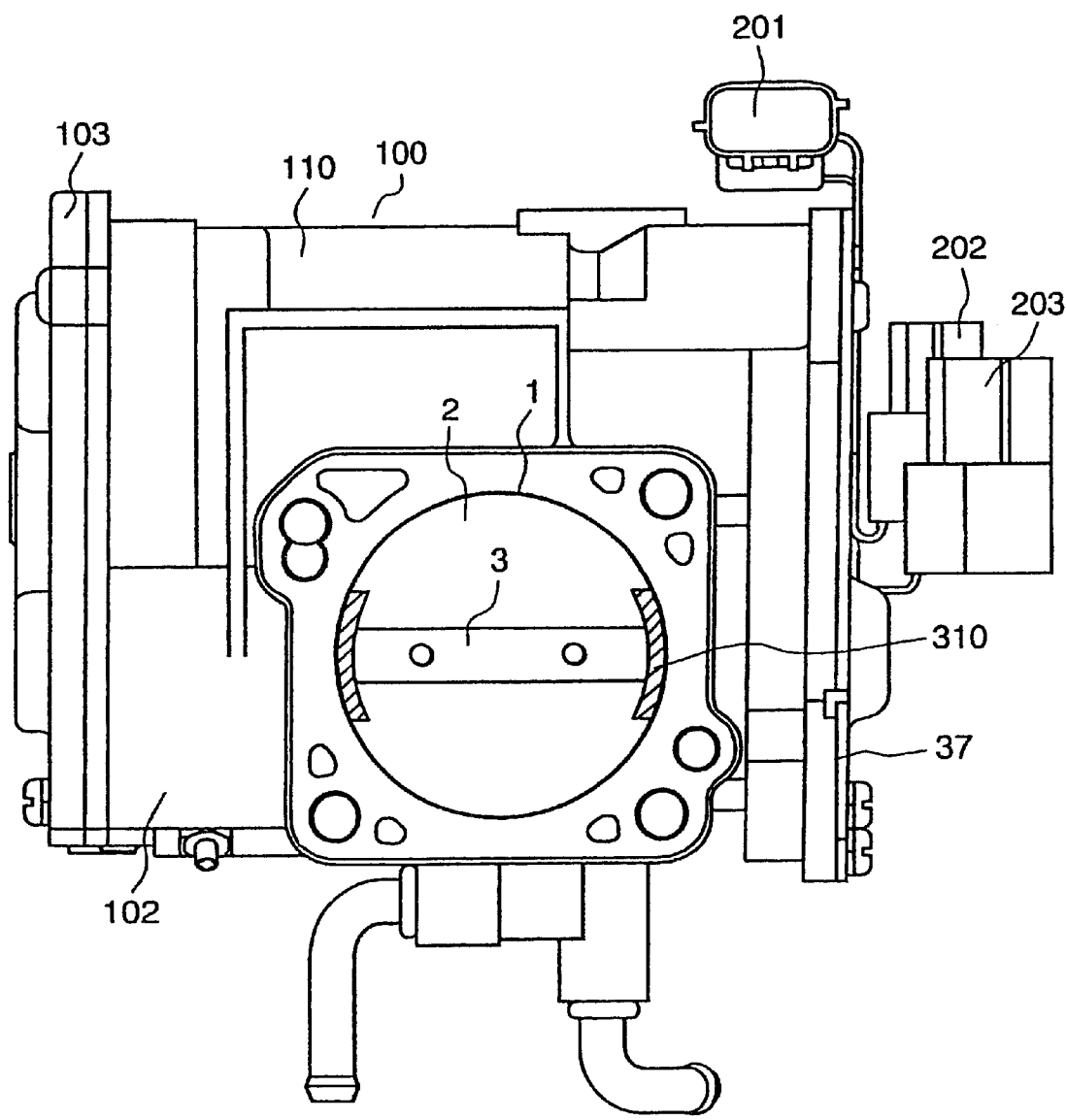
FIG. 6 is a rear view of the first embodiment.
Figure 9:
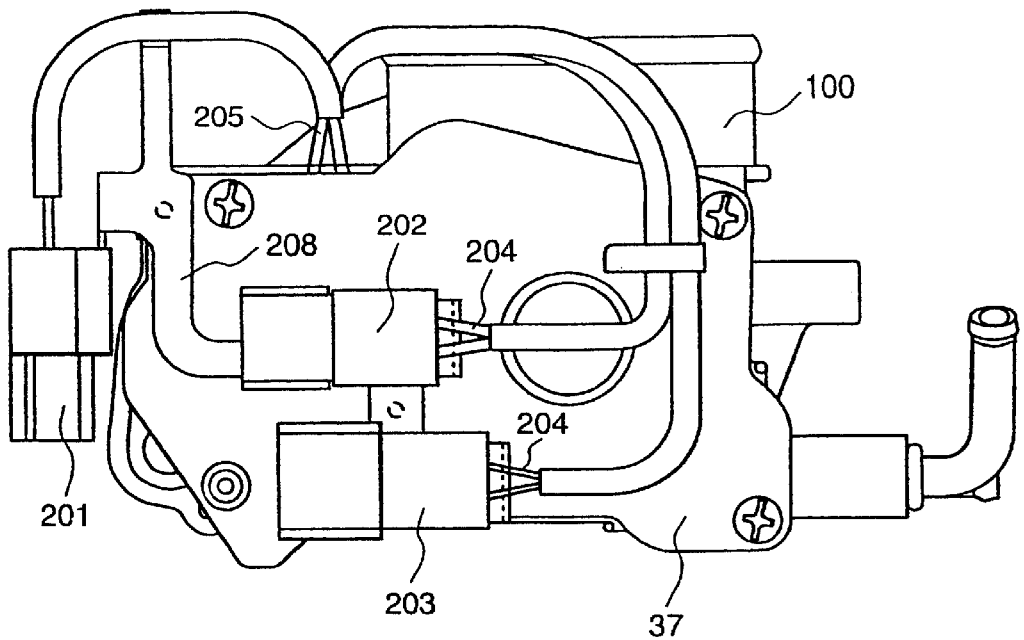
FIG. 9 is a view showing a one side of the throttle body of FIG. 7.

As shown in FIGS. 5, 6, and 9, the connector and throttle sensor case 107 is covered with a cover 37, and a wiring guide 123 for gathering and guiding the electric power supply wires 205 to be connected to a connector and the lead wires 204 of the throttle sensor 30 is fit into a groove 122 provided on the wall portion of the connector and throttle sensor case 107 to be attached with the cover 37. The wiring guide 123 is formed of a rubber plate, and has a plurality of guide holes 124 used for penetrations of the electric power supply wires 205 and the sensor lead wires 204.

Since the wiring extracting portion 30*a* of the throttle sensor 30 is placed directing to the motor terminal connector containing space 107*b* as described above, the wires 204 led from the terminal of the throttle sensor 30 and the wires 205 led from the motor terminal 51 through the connector 190 can be merged at adjacent positions in the beginning in the one room, and accordingly these wires can be gathered without difficulty and can be extracted out of the throttle body. Therefore, this construction is useful to simplify the wiring work and the part assembling work.

In order to reduce manufacturing cost, an electromagnetic shield member 206 of the wires 204, 205 is a woven shield composed of a tube-shaped member formed by weaving glass fiber and a woven thin metal wire member covering the tube-shaped member.

Figure 13:
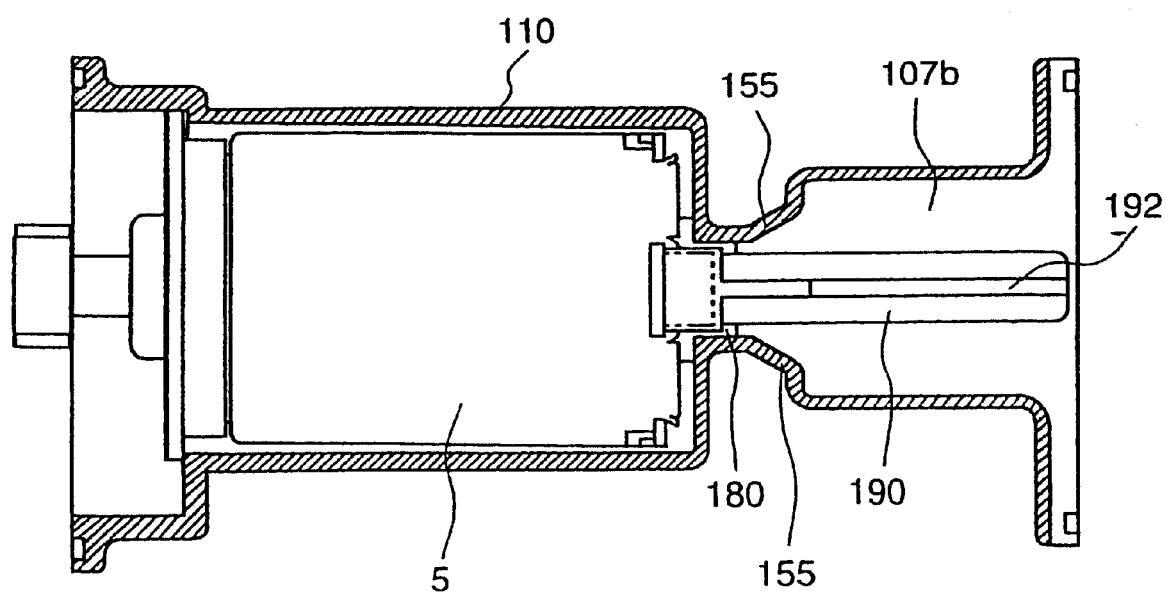
FIG. 13 is a cross-sectional view showing the motor case and connecting terminal connector provided in the throttle body of the first embodiment.

The motor terminal extracting port 180 provided in the bottom portion of the motor case 110 is exposed to the connector containing portion (the containing space) 107*b*, and the guide 155 for guiding the connector to the motor terminal extracting port 180 when the connector is plugged to the motor terminal 51 is formed on the inner wall surface of the containing portion 107*b* of the motor terminal connector 190. (refer to FIG. 10, FIG. 13. FIG. 10 is a view showing the inside of the connector and throttle sensor case 107 detaching the motor terminal connector 190 and seeing from the side of the case opening. FIG. 13 is a C—C line cross-sectional view showing the motor terminal connector under a connecting process being taking on the plane of the line C—C of FIG. 10.)

The guide 155 is formed at mold forming of the throttle body 100 at the same time, and composed of a pair of opposite wall surfaces formed in such a shape that the width is wide in the receiving side of the connector and gradually narrowed toward the motor terminal extracting port 180.

Figure 11A:
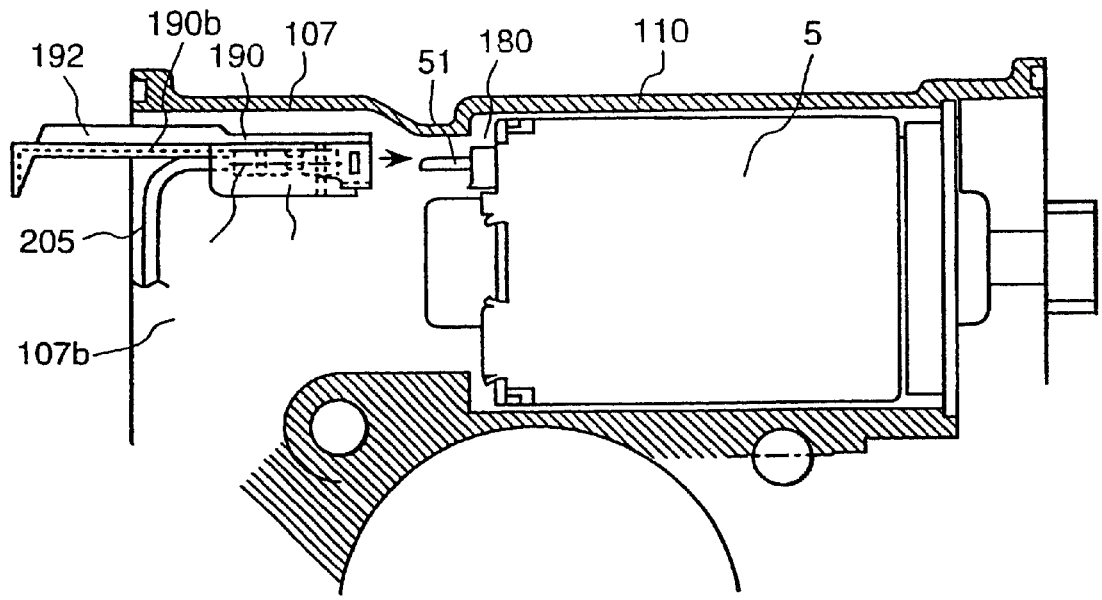
FIGS. 11A and 11B each is an explanatory view showing the process of connecting a motor terminal with a terminal connector used in the above-mentioned embodiment.
Figure 11B:
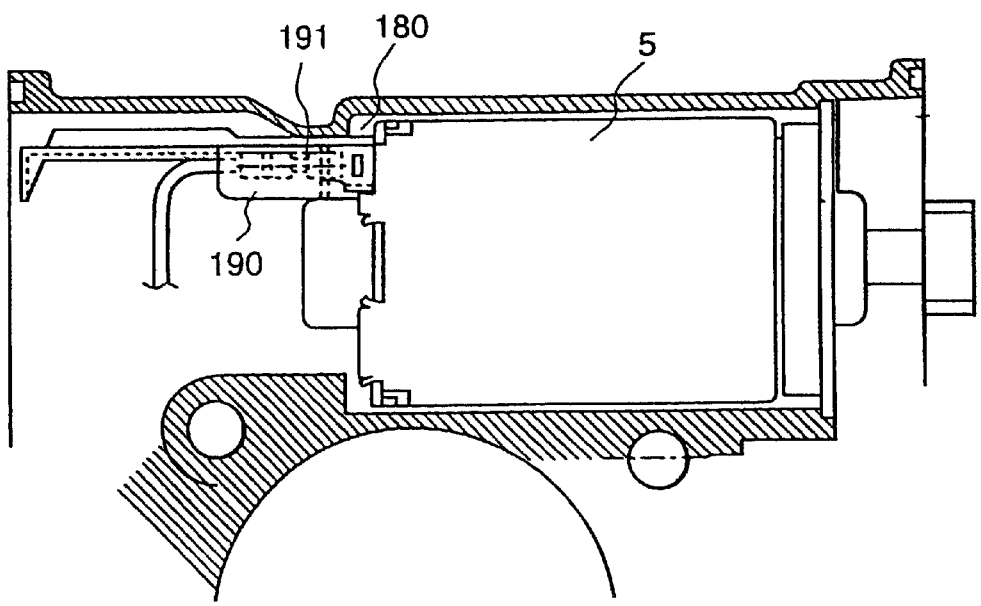
Figure 12:
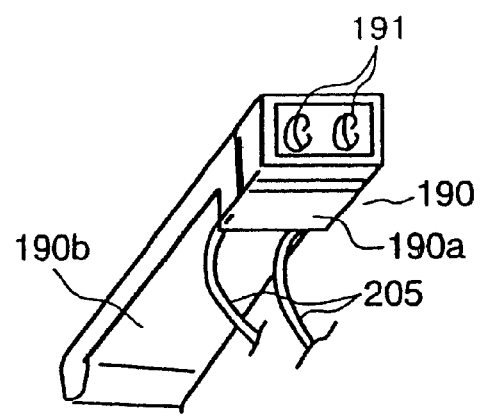
FIG. 12 is a perspective view showing the terminal connector.

FIG. 11 is a cross-sectional view showing the inner structure of the motor case 110 and the connector and throttle sensor case 107 seeing by changing the view angle from FIG. 13. FIG. 11A shows a state halfway through the process of plugging the connector, and FIG. 11B shows a state after plugging the connector 190 to the motor terminal 51.

The connector 190 can be easily connected to the motor terminal 51 without difficulty of positioning the connector 190 to the motor terminal 51 because by containing the motor 5 in the motor case 110 the motor terminal 51 can be seen in the connector containing space 107*b* through the terminal extracting port 180, and in this state the motor terminal connector 190 is inserted from the terminal containing portion 107*b* using the guide 155. Even if the motor terminal 51 is, particularly, placed in a deep position of the connector containing portion 107*b* and behind the other parts, the connector can be inserted by being guided by the above-mentioned guide 155 without difficulty while being positioned.

As shown in FIGS. 4, 11A, 11B and 12, the motor terminal connector 190 is a plastic molded member of a socket type, and a pair of metal chips 191 for terminal connector is embedded in the motor terminal connector. In this embodiment, the portion 190*a* embedding the metal chips 191 is formed in a nearly rectangular shape and a portion following to the portion 190a is formed in a plate with reinforcing rib 192 to rationalize use of material. The connector 190 is guided to the terminal extracting port 108 placed at a deep position through a narrow portion. Therefore, in order to make the plugging work easy, the length from the motor terminal extracting port 108 to a position near the opening of the connector and throttle sensor case 107 is shortened.

As shown in FIGS. 5, 6 and 9, a belt-shaped metal member 208 for holding the plurality of connectors 201 to 203 is welded on an outer surface of the cover 37 of the connector and throttle sensor case 107. By attaching the plurality of connectors 201 to 203 to the belt-shaped metal member 208 based on a predetermined layout, wire connecting work can be easily performed without trouble of the layout configuration of the connector parts at assembling at the manufacturing location. The reference character 250 of FIG. 3 indicates an engine cooling water inlet pipe.

Figure 15:
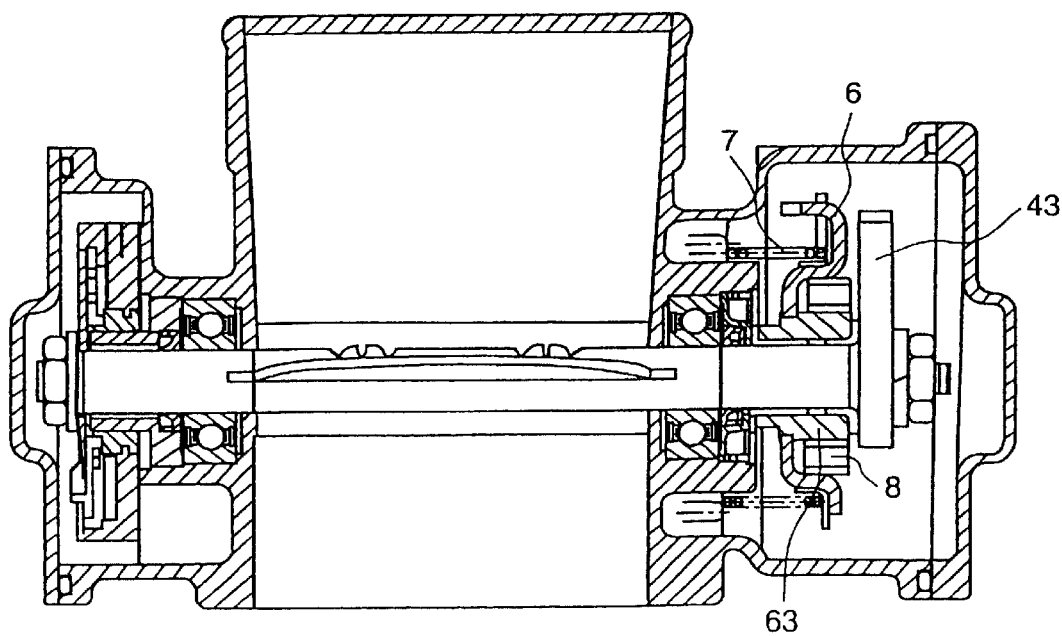
FIG. 15 is a vertical cross-sectional view showing a third embodiment in accordance with the present invention.

The coil-shaped torsion spring is used for the returning spring 7 and the default spring 8 in this embodiment, but it is not limited to the coil-shaped torsion spring. For example, a belt-shaped coil spring may be used. An embodiment of FIG. 15 employs a belt-shaped coil spring for the default spring 8, but the other structure is the same as that of the first embodiment. According to this type, the inside of the gear case can be made smaller.

Figure 14:
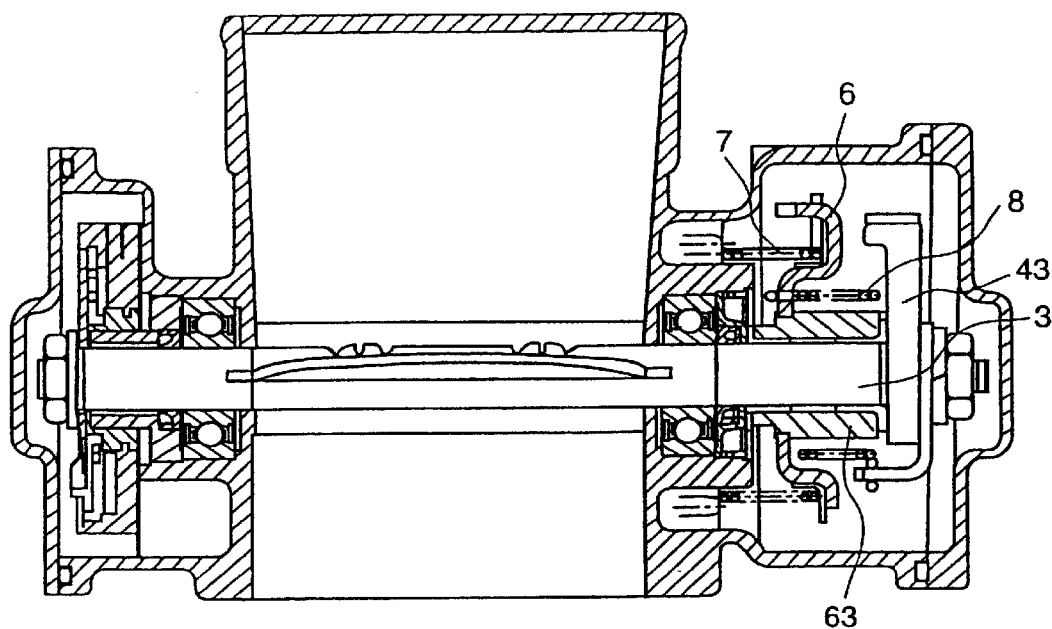
FIG. 14 is a vertical cross-sectional view showing a second embodiment in accordance with the present invention.

An embodiment of FIG. 14 eliminates the collar members 14, 15, but the other structure is the same as that of the first embodiment.

Figure 16A:
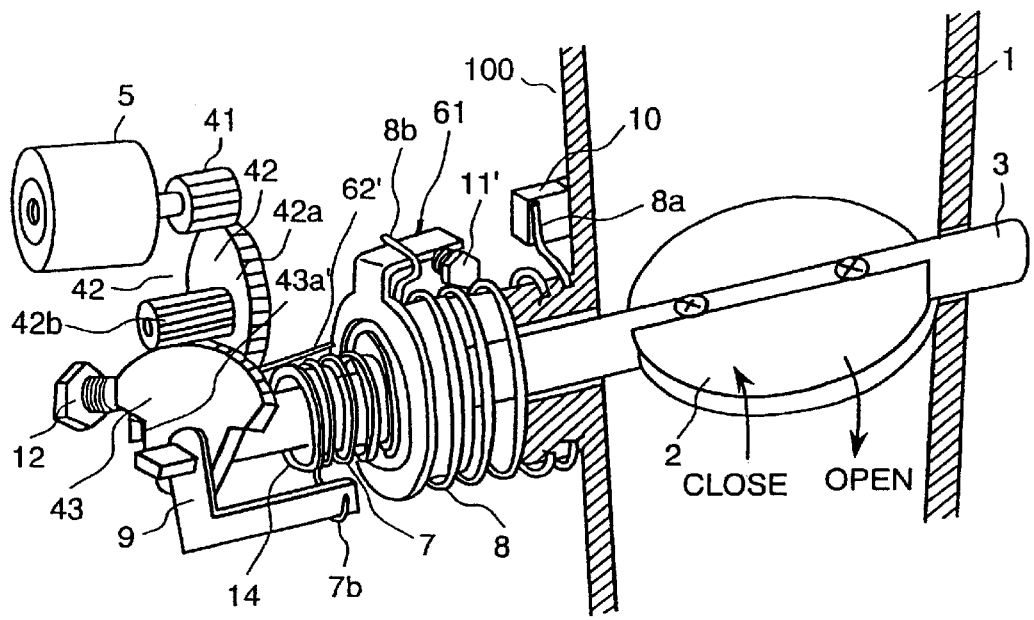
FIGS. 16A and 16B each is a perspective view showing an outline of a fourth embodiment of an electronic control throttle device in accordance with the present invention and a view explaining the principle.
Figure 16B:
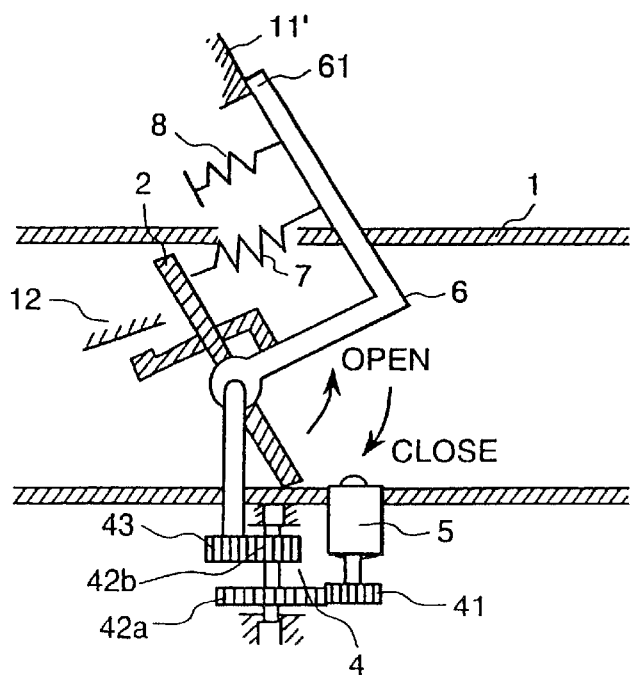

In an embodiment of FIGS. 16A and 16B, contrary to the above-mentioned embodiments, the returning spring 7 is placed outside the default spring 8.

The principle of the electronic control throttle device of FIGS. 16A and 16B is as follows.

In this embodiment, the gear (the fixing side engaging element) 43 fixed to the throttle valve shaft 3 and the default lever 6 idly inserted onto the throttle valve shaft 3 and rotatable relative to the throttle valve shaft are connected with the returning spring 7 so as to attract each other. this connection can be performed by fastening one end of the returning spring 7 to the default lever 6 and the other end of the returning spring 7 to a spring fastening portion 9 of the throttle valve shaft 3.

On the other hand, the default spring 8 acts a force on the default lever 6 in a direction to open the throttle valve by fastening one end 8a of the default spring 8 to a spring fastening portion 10 provided in the throttle body 100 and the other end 8b to a spring fastening portion 61 of the default lever 6.

By constructing as described above, the gear (the fixing side engaging element) 43 and the default lever (the moving side engaging element) 6 are rotatable in being engaged together opposing against the force of the default spring 8 within the range of opening degrees below the default opening degree. The default lever 6 is blocked to move by the default opening degree setting stopper 11' and only the throttle gear 43 becomes rotatable opposing against the force of the returning spring 7 together with the throttle valve shaft 3 within the range of opening degrees above the default opening degree. In this embodiment, the diameter of the default spring 8 is larger than the diameter of the returning spring 7, and the springs are arranged around the shaft of the throttle valve shaft 3 so that the default spring 8 is outside and the returning spring 7 is inside.

Although arrangement of the springs 7, 8 in this embodiment is reverse to the arrangement in the first embodiment, arrangement of the other parts is the same as that in the above-described embodiments. By doing so, the same effect as that of the first embodiment can be attained.

Figure 17:
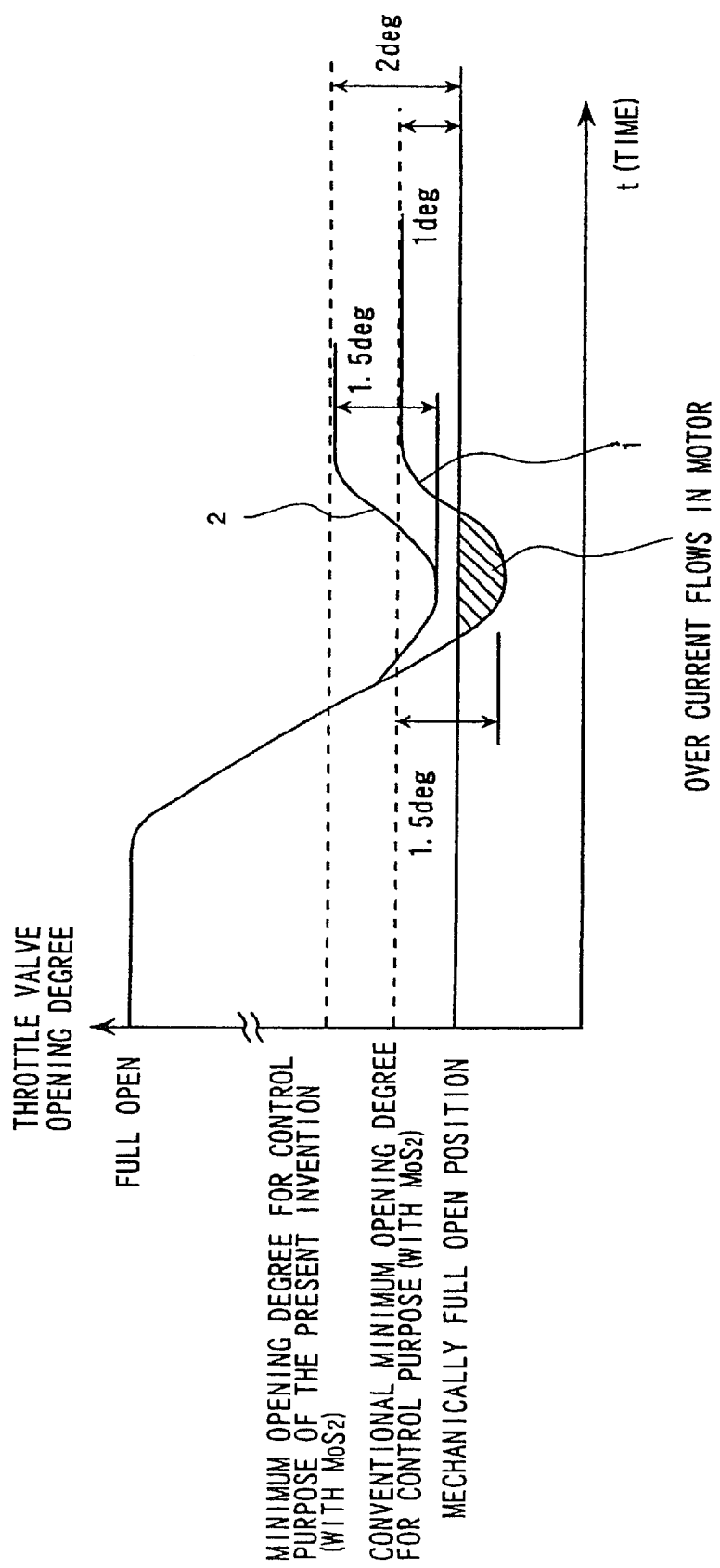
FIG. 17 is a explanatory chart showing the relationship between overshoot occurring in the electronic control throttle and the minimum opening degree for the control purpose of the throttle valve.

In each embodiment of the electronic control throttle device, the gap (the shaft supporting gap) between the throttle valve shaft 3 and the shaft inserting through hole 181 for guiding the throttle valve shaft 3 to the bearing 20 provided in the wall portion of a throttle body is filled with an air leak preventing material. The air leak preventing material, for example, a dryable liquid lubricant such as molybdenum disulfide ($MOS_2$) is applied from downstream side of the throttle valve 2 onto the limited areas of gap between the throttle valve shaft 3 and the shaft inserting through holes 181 and the surrounding such as the diagonally shaded areas shown by the reference character 310 in FIG. 6, and penetrates and fills the shaft supporting gap. By filling the shaft supporting gaps with the air leak preventing material, since the intake air flow rate (the leak air flow rate) supplied to the internal combustion engine through the shaft supporting gap of the throttle valve shaft can be eliminated, the minimum opening degree on the control of the throttle valve can be increased larger than in the conventional one by that amount. In the present invention, by making use of this fact the controlled minimum opening degree is set a value larger than the overshoot of the throttle valve when opening degree of the throttle valve is changed from the maximum opening degree of the throttle valve to the maximum opening degree. The operation and effects are as described in the section SUMMARY OF THE INVENTION. That is, by applying the air leak preventing material (for example, molybdenum disulfide), as shown in FIG. 17, since the minimum opening degree can be set a value larger than the mechanical full close position by approximately 2° (in a conventional case, a value larger than the mechanical full close position by approximately 1°), the minimum opening degree can be increased higher by a value corresponding to the overshoot (for instance, approximately 1.5°) when opening degree of the throttle valve is changed from the maximum opening degree (the electrical full open position) to the minimum opening degree (the electrical full close position) as shown by the line ②. Therefore, the stopper blocking element in the side of the throttle valve can be prevented from hitting on the stopper (the full close stopper) determining the mechanical full close position even if the overshoot occurs. Accordingly, even if the overshoot occurs, it is possible to prevent over current from flowing in the motor.

Further, by applying the air leak preventing material to the shaft supporting gaps and the surrounding, the following operation and effect can be obtained.

That is, in a case of performing idling rotating speed control using the electronic control throttle device, in addition to the normal engine rotating speed feedback control there is a state of open control in order to cope with inrush load such as operation of an air conditioner. Further, in a gasoline engine directly injecting fuel into the engine (DI-G engine), since the required air flow rate is increased during stratified combustion (ultra-lean burn) regardless of the engine rotating speed (A/F=40:1), there is a state of open control. Therefore, it is necessary to improve accuracy of air flow rate to throttle opening degree (particularly, accuracy near 1 to 7°).

However, when the air leak preventing material is applied onto the air passage wall along the whole circumference of the throttle valve, accuracy of air flow rate, particularly, accuracy in a low opening degree range has been low due to deviations in applying thickness and concentration of the air leak preventing material.

Figure 18:
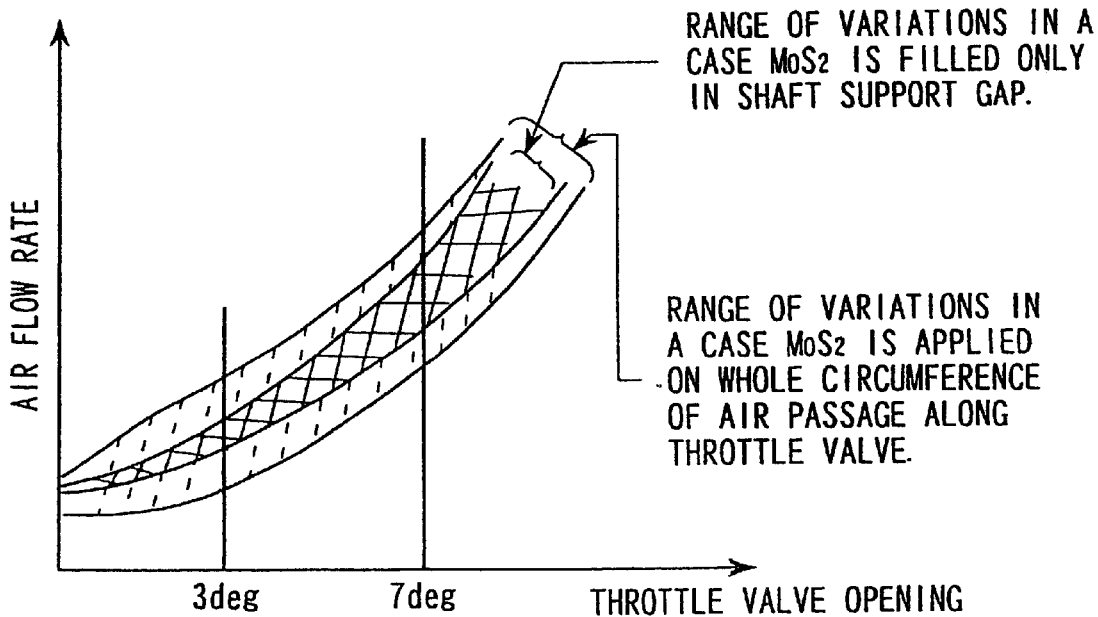
FIG. 18 is a graph showing variations in air flow rate versus throttle valve opening degree in a case where an air leakage preventing member is applied along the whole circumference of the throttle valve in the air flow passage of the electronic control throttle and in a case where the air leakage preventing member is applied and filled only in the shaft support gap.

On the other hand, when the air leak preventing material is not applied onto most part of the circumference of the throttle valve by limiting the applying area of the air leak preventing material only to the shaft support gap and the surrounding, the cause of the deviations can be eliminated and the accuracy of air flow rate can be improved. As an experimental result verifying the above-mentioned effect, FIG. 18 is a graph showing variations in air flow rate versus throttle valve opening degree in a case where an air leakage preventing member is applied along the whole circumference of the throttle valve in the air flow passage of the electronic control throttle and in a case where the air leakage preventing member is applied and filled only in the shaft support gap.

According to the present invention, an electronic control throttle device having an electric drive actuator, a gear mechanism, a default opening degree setting mechanism can be made small in size, light in weight and simple in assembling and wire harness.

Further, reliability of the electronic control throttle device can be improved by preventing the throttle valve from hitting on a stopper at the mechanical full close position even if an overshoot specific to the electronic control throttle device occurs when the throttle valve rapidly changes from the maximum opening degree on the control purpose to the minimum opening degree.

What is claimed is:

1. A throttle device for an internal combustion engine, comprising an electric drive actuator for opening and closing a throttle valve based on a signal controlling an intake air flow rate of the internal combustion engine, wherein,
   a gap between a throttle valve shaft and a shaft inserting through hole for guiding said throttle valve shaft to a bearing provided in a wall portion of a throttle body is filled with an air leak preventing material, and a minimum opening degree of said throttle valve is set to a value larger than an amount of overshoot of said throttle valve occurring when opening degree of said throttle valve to the minimum opening degree.

2. A throttle device for an internal combustion engine according to claim 1, wherein said air leak preventing material is molybdenum disulfide, and is applied onto portions between said throttle valve shaft and said shaft inserting through hole and the surrounding portions around an outer periphery of said throttle valve.

3. A throttle device for an internal combustion engine comprising an electric drive actuator for opening and closing a throttle valve based on a signal controlling an intake air flow rate of the internal combustion engine, wherein a gap between a throttle valve shaft driven to open and close the throttle valve by said electric drive actuator and a shaft inserting through hole for guiding said throttle valve shaft to a bearing provided in a wall portion of a throttle body is filled with an air leak preventing material.

4. A throttle device for an internal combustion engine according to any one of claim 1 and claim 3, wherein said air leak preventing material is molybdenum disulfide, and applied onto portions limited to between said throttle valve shaft and said shaft inserting through hole and the surrounding portions around an outer periphery of said throttle valve.

5. A throttle device for an internal combustion engine, comprising an electric drive actuator for opening and closing a throttle valve based on a signal controlling an intake air flow rate of the internal combustion engine, wherein
   a minimum opening degree of said throttle valve is set to a value such that said throttle valve does not hit to a full close stopper by overshooting said throttle valve when said throttle valve is changed from a maximum opening degree of said throttle valve to the minimum opening degree.

* * * * *